United States Patent
Lee et al.

(10) Patent No.: US 9,100,067 B2
(45) Date of Patent: Aug. 4, 2015

(54) METHOD FOR SUPPRESSING INTERFERENCE OF TERMINAL IN MULTIPLE INPUT MULTIPLE OUTPUT WIRELESS COMMUNICATION SYSTEM AND APPARATUS THEREFOR

(75) Inventors: Daewon Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 13/980,127

(22) PCT Filed: Jul. 27, 2011

(86) PCT No.: PCT/KR2011/005533
§ 371 (c)(1),
(2), (4) Date: Jul. 17, 2013

(87) PCT Pub. No.: WO2012/141384
PCT Pub. Date: Oct. 18, 2012

(65) Prior Publication Data
US 2013/0301596 A1   Nov. 14, 2013

Related U.S. Application Data

(60) Provisional application No. 61/475,638, filed on Apr. 14, 2011.

(51) Int. Cl.
*H04W 4/00* (2009.01)
*H04B 7/04* (2006.01)
(Continued)

(52) U.S. Cl.
CPC .............. *H04B 7/0408* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS 8,447,236 B2 * 5/2013 Gorokhov et al. ............ 455/63.1
8,483,145 B2 * 7/2013 Astely .......................... 370/329
(Continued)

FOREIGN PATENT DOCUMENTS

| KR | 10-2008-0087211 A | 1/2008 |
| KR | 10-2010-0086407 A | 7/2010 |
| WO | 2010/085092 A2 | 7/2010 |

OTHER PUBLICATIONS

R1-110533, 3GPP TSG RAN WG1 Meeting #63bis, Dublin, Ireland, Jan. 17-Jan. 21, 2011.
(Continued)

*Primary Examiner* — Phirin Sam
(74) *Attorney, Agent, or Firm* — McKenna Long & Aldridge LLP

(57) ABSTRACT

Disclosed is a method for enabling a terminal to process a signal in a wireless communication system. Specifically, the method for enabling a terminal to process a signal in the wireless communication system includes the steps of: estimating a recommended transmission beamforming vector and a prior received filtering vector; calculating an effective channel for an adjacent cell by applying the prior received filtering vector to a signal received from the adjacent cell; estimating a constraint beamforming vector for the adjacent cell on the basis of the effective channel; transmitting the information of the transmission beamforming vector and the constraint beamforming vector to the serving cell; receiving adaptive response signals of the transmission beamforming vector and the constraint beamforming vector and the constraint beamforming vector; and receiving the signal to which the transmission beamforming vector is applied, from the serving cell by applying the prior received filtered vector.

14 Claims, 14 Drawing Sheets

(51) Int. Cl.
*H04B 7/06* (2006.01)
*H04W 16/28* (2009.01)
*H04B 7/02* (2006.01)
*H04L 5/00* (2006.01)
*H04L 27/26* (2006.01)

(52) U.S. Cl.
CPC ............ *H04B 7/0634* (2013.01); *H04W 16/28* (2013.01); *H04B 7/0665* (2013.01); *H04L 5/0023* (2013.01); *H04L 5/0053* (2013.01); *H04L 27/2633* (2013.01); *H04L 27/2636* (2013.01)

(56) References Cited

U.S. PATENT DOCUMENTS

| | | | | |
|---|---|---|---|---|
| 2008/0095259 | A1* | 4/2008 | Dyer et al. | 375/265 |
| 2008/0260059 | A1 | 10/2008 | Pan | |
| 2009/0061786 | A1* | 3/2009 | Malik et al. | 455/69 |
| 2009/0262843 | A1* | 10/2009 | Krasny et al. | 375/260 |
| 2010/0232494 | A1* | 9/2010 | Gaur | 375/233 |
| 2010/0309854 | A1* | 12/2010 | Wu et al. | 370/329 |
| 2010/0329369 | A1* | 12/2010 | Hou et al. | 375/260 |
| 2011/0058599 | A1* | 3/2011 | Gaur | 375/233 |
| 2011/0223867 | A1* | 9/2011 | Chae et al. | 455/63.1 |
| 2012/0040629 | A1* | 2/2012 | Li et al. | 455/91 |
| 2012/0114064 | A1* | 5/2012 | Kotecha et al. | 375/295 |
| 2012/0170442 | A1* | 7/2012 | Razaviyayn et al. | 370/203 |
| 2013/0064315 | A1* | 3/2013 | Heath et al. | 375/260 |
| 2013/0177094 | A1* | 7/2013 | Jongren | 375/267 |
| 2014/0050275 | A1* | 2/2014 | Kotecha et al. | 375/267 |
| 2014/0134956 | A1* | 5/2014 | Lee et al. | 455/67.11 |
| 2014/0146774 | A1* | 5/2014 | Baker et al. | 370/329 |

OTHER PUBLICATIONS

Motorola: "PMI downlink signaling and PDCCH format", 3GPP DRAT; R1-074001—PMI Signaling & PDCCH Format, 3rd Generation Partnership Project (3GPP), Mobile Competence Cetre; 650, Route Des Lucioles; F-06921 Sophia-Antipolis Cedexl; France, vol. RAN WG1, No. Shanghai, China; Oct. 8, 2007-Oct. 12, 2007, Oct. 3, 2007, XP050596520.

* cited by examiner

FIG. 3
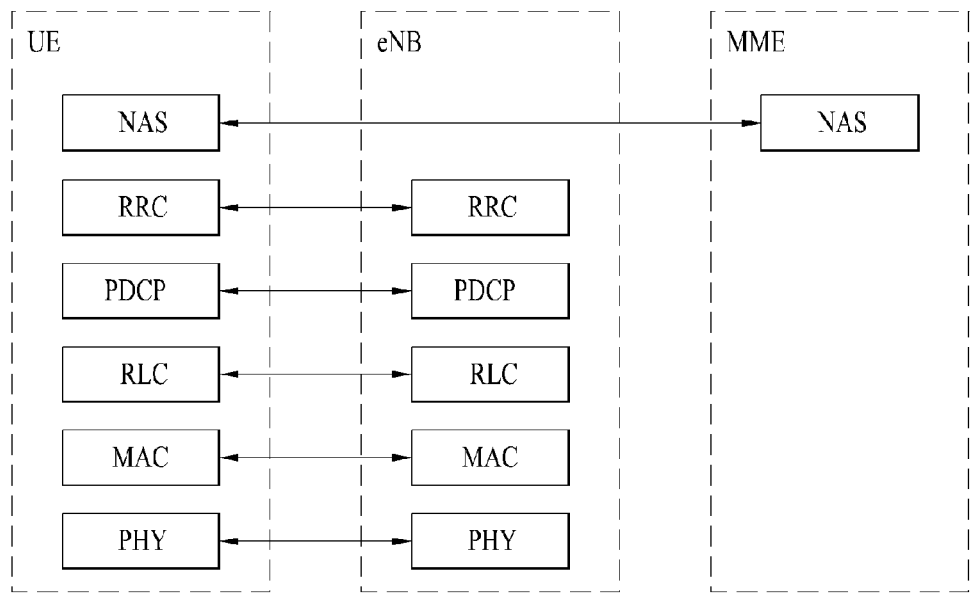
(a) Control - Plane Protocol Stack
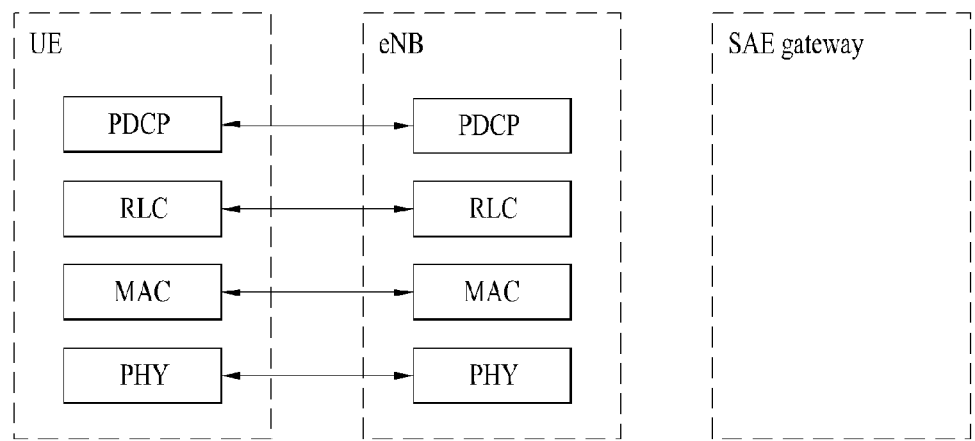
(b) User - Plane Protocol Stack

METHOD FOR SUPPRESSING INTERFERENCE OF TERMINAL IN MULTIPLE INPUT MULTIPLE OUTPUT WIRELESS COMMUNICATION SYSTEM AND APPARATUS THEREFOR

This application is a 35 USC §371 National Stage entry of International Application No. PCT/KR2011/005533 filed on Jul. 27, 2011, and claims the benefit and priority to U.S. Provisional Application No. 61/475,638 filed Apr. 14, 2011 all of which are incorporated by reference in their entirety herein.

TECHNICAL FIELD

Embodiments of the present invention relate to a wireless communication system, and more particularly to a method and apparatus for suppressing interference of a User Equipment (UE) in a Multiple Input Multiple Output (MIMO) wireless communication system.

BACKGROUND ART

As a representative example of a wireless communication system of the present invention, $3^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARM)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention is to provide a method and apparatus for suppressing interference of a UE in a MIMO wireless communication system.

Technical Solution

The object of the present invention can be achieved by providing a method for processing a signal by a user equipment (UE) in a wireless communication system including: calculating a recommended transmit (Tx) beamforming vector $V_{a1}$ of a serving cell and a pre-receive filtering vector $U_{a1}{}^H$, on the basis of a channel $H_a$ related to the serving cell; calculating an effective channel $\tilde{H}_b$ related to the contiguous cell by applying the pre-receive filtering vector $U_{a1}{}^H$ to a signal received from a contiguous cell; calculating a restricted beamforming vector $\tilde{V}_{b0}$ of the contiguous cell on the basis of the effective channel $\tilde{H}_b$; transmitting information of the Tx beamforming vector $V_{a1}$ and the restricted beamforming vector $\tilde{V}_{b0}$ to the serving cell; receiving a response signal obtained by application of the Tx beamforming vector $V_{a1}$ and the restricted beamforming vector $\tilde{V}_{b0}$, from the serving cell; and after application of the pre-receive filtering vector $U_{a1}{}^H$ receiving a signal to which the Tx beamforming vector $V_{a1}$ is applied from the serving cell.

In accordance with another aspect of the present invention, a user equipment (UE) for use in a wireless communication system includes: a radio frequency (RF) communication module configured to transmit/receive a signal to/from one or more cells; and a processor configured to control the RF communication module and process the signal, wherein the processor calculates a recommended transmit (Tx) beamforming vector $V_{a1}$ of a serving cell and a pre-receive filtering vector $U_{a1}{}^H$ on the basis of a channel $H_a$ related to the serving cell, calculates an effective channel $\tilde{H}_b$ related to the contiguous cell by applying the pre-receive filtering vector $U_{a1}{}^H$ to a signal received from a contiguous cell, calculates a restricted beamforming vector $\tilde{V}_{b0}$ of the contiguous cell on the basis of the effective channel $\tilde{H}_b$, and the RF communication module transmits information of the Tx beamforming vector $V_{a1}$ and the restricted beamforming vector $\tilde{V}_{b0}$ to the serving cell, receives a response signal obtained by application of the Tx beamforming vector $V_{a1}$ and the restricted beamforming vector $\tilde{V}_{b0}$ from the serving cell, and after application of the pre-receive filtering vector $U_{a1}{}^H$, receives a signal to which the Tx beamforming vector $V_{a1}$ is applied from the serving cell.

The contiguous cell may transmit a signal using a beamforming vector $\tilde{V}_{b1}$ orthogonal to the restricted beamforming vector $\tilde{V}_{b0}$.

The application response signal may be received from the serving cell through a physical downlink control channel (PDCCH).

The application response signal may be received from the serving cell through higher layer signaling.

The recommended Tx beamforming vector $V_{a1}$ may be a vector which has a highest singular value at $V_a$ ($=[V_{a1}\ V_{a0}]$) calculated on the basis of the channel $H_a$.

The information of the restricted beamforming vector $\tilde{V}_{b0}$ may denote information related to a beamforming vector $\tilde{V}_{b1}$ orthogonal to the restricted beamforming vector $\tilde{V}_{b0}$.

The channel $H_a$ may be denoted by $U_a \cdot \Lambda_a \cdot V_a^H$, and the effective channel $\tilde{H}_b$ related to the contiguous cell may be denoted by $\tilde{U}_b \cdot \tilde{\Lambda}_b \cdot \tilde{V}_b^H$.

Advantageous Effects

According to embodiments of the present invention, a UE for use in the MIMO wireless communication system can efficiently suppress interference from a contiguous cell.

It will be appreciated by persons skilled in the art that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 3 illustrates a control plane and a user plane (U-Plane) of a radio interface protocol between a User Equipment (UE) and an E-UTRAN according to the 3GPP wireless access network standard.

BEST MODE

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary. In addition, although the embodiment of the present invention will be disclosed on the basis of an FDD scheme as an example, the scope or spirit of the embodiment of the present invention is not limited thereto and can also be applied to H-FDD and TDD schemes as necessary.

Figure 1:
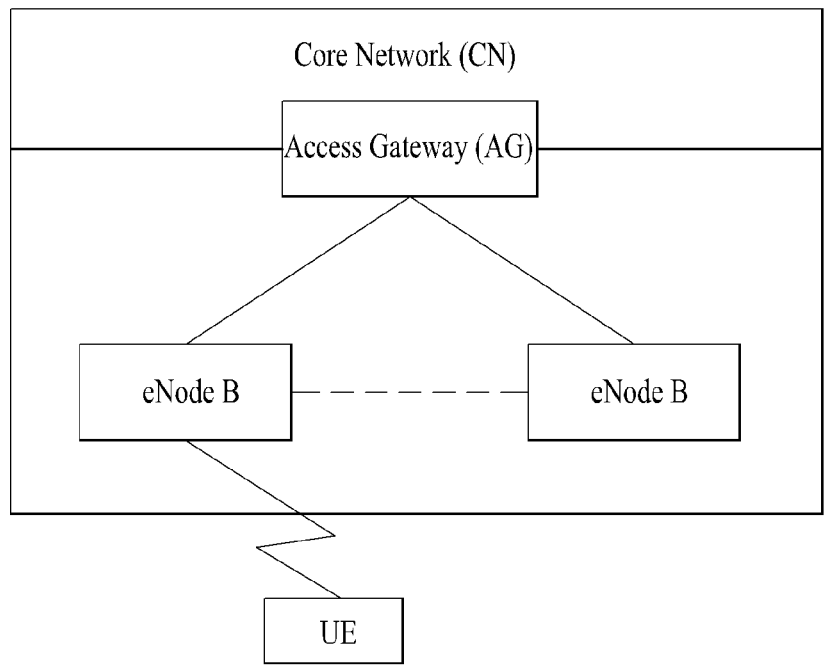
FIG. 1 is a conceptual diagram illustrating an Evolved Universal Mobile Telecommunications System (E-UMTS) network structure as an example of a wireless communication system.
Figure 2:
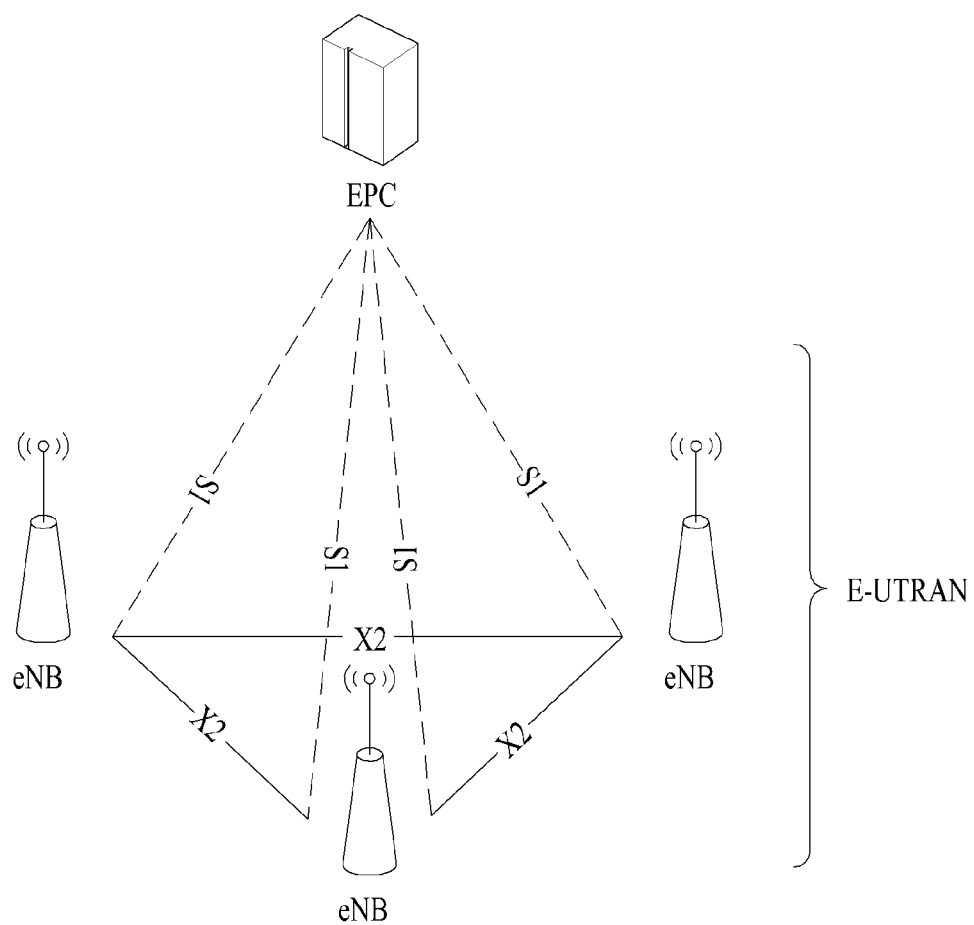
FIG. 2 is a conceptual diagram illustrating an Evolved Universal Terrestrial Radio Access Network (E-UTRAN) structure.

FIG. 2 is a conceptual diagram illustrating a network structure of an Evolved Universal Terrestrial Radio Access Network (E-UTRAN) system. Specifically, the E-UTRAN system is an evolved version of the conventional UTRAN system. The E-UTRAN includes one or more cells that will also be referred to as "eNode B(s)" or "eNB(s)". The eNBs are connected through an X2 interface. Each eNB is connected to the User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

FIG. 3 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH).

In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 4:
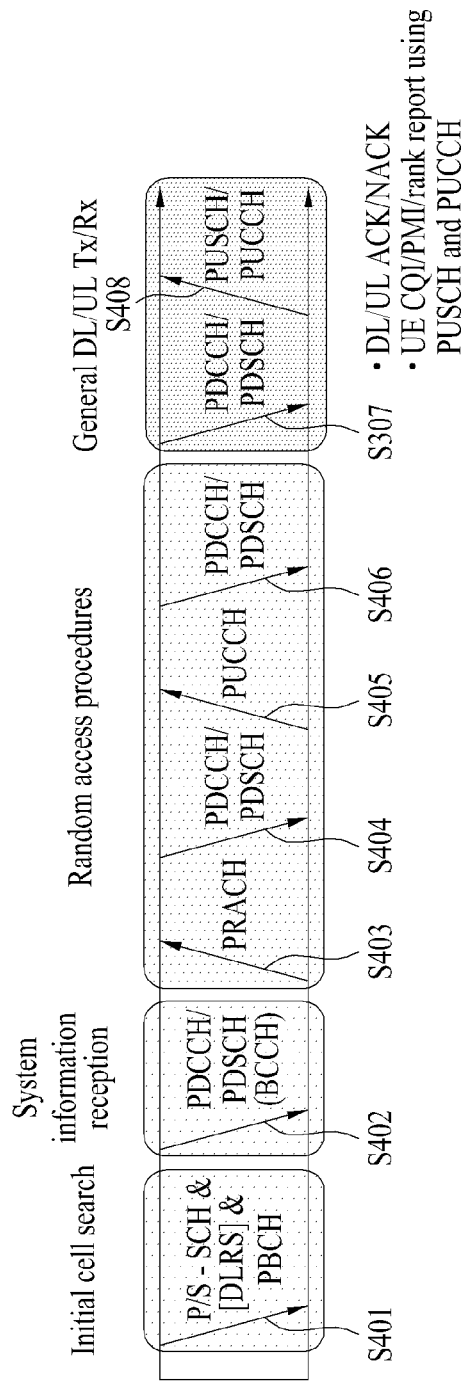
FIG. 4 is a conceptual diagram illustrating physical channels used in a 3GPP LTE system acting as an exemplary mobile communication system and a general method for transmitting a signal using the physical channels.

FIG. 4 is a conceptual diagram illustrating physical channels for use in a 3GPP system and a general method for transmitting a signal using the physical channels.

Referring to FIG. 4, when powered on or when entering a new cell, a UE performs initial cell search in step S401. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S402.

On the other hand, if the UE initially accesses the BS or if the UE does not have radio resources for signal transmission, it may perform a random access procedure to the BS in steps S403 to S406. For the random access, the UE may transmit a predetermined sequence as a preamble to the BS on a Physical Random Access CHannel (PRACH) in step S403 and receive a response message for the random access on a PDCCH and a PDSCH corresponding to the PDCCH in steps S404. In the case of contention-based RACH, the UE may perform a contention resolution procedure.

After the foregoing procedure, the UE may receive a PDCCH and a PDSCH in step S407 and transmit a Physical Uplink Shared CHannel (PUSCH) and a Physical Uplink Control CHannel (PUCCH) in step S408, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 5:
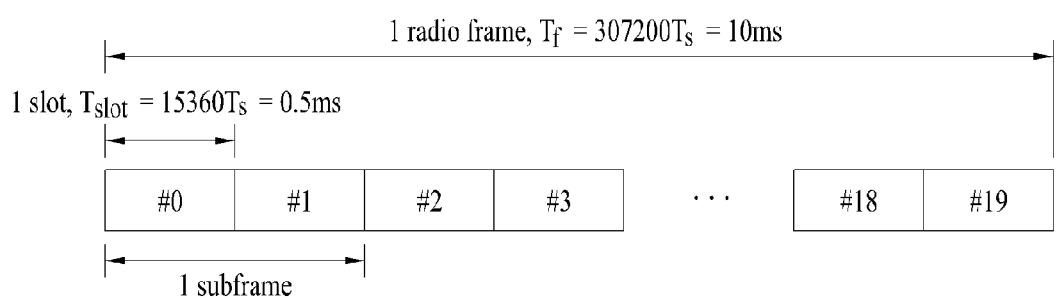
FIG. 5 is a diagram illustrating a structure of a radio frame for use in a Long Term Evolution (LTE) system.
Figure 6:
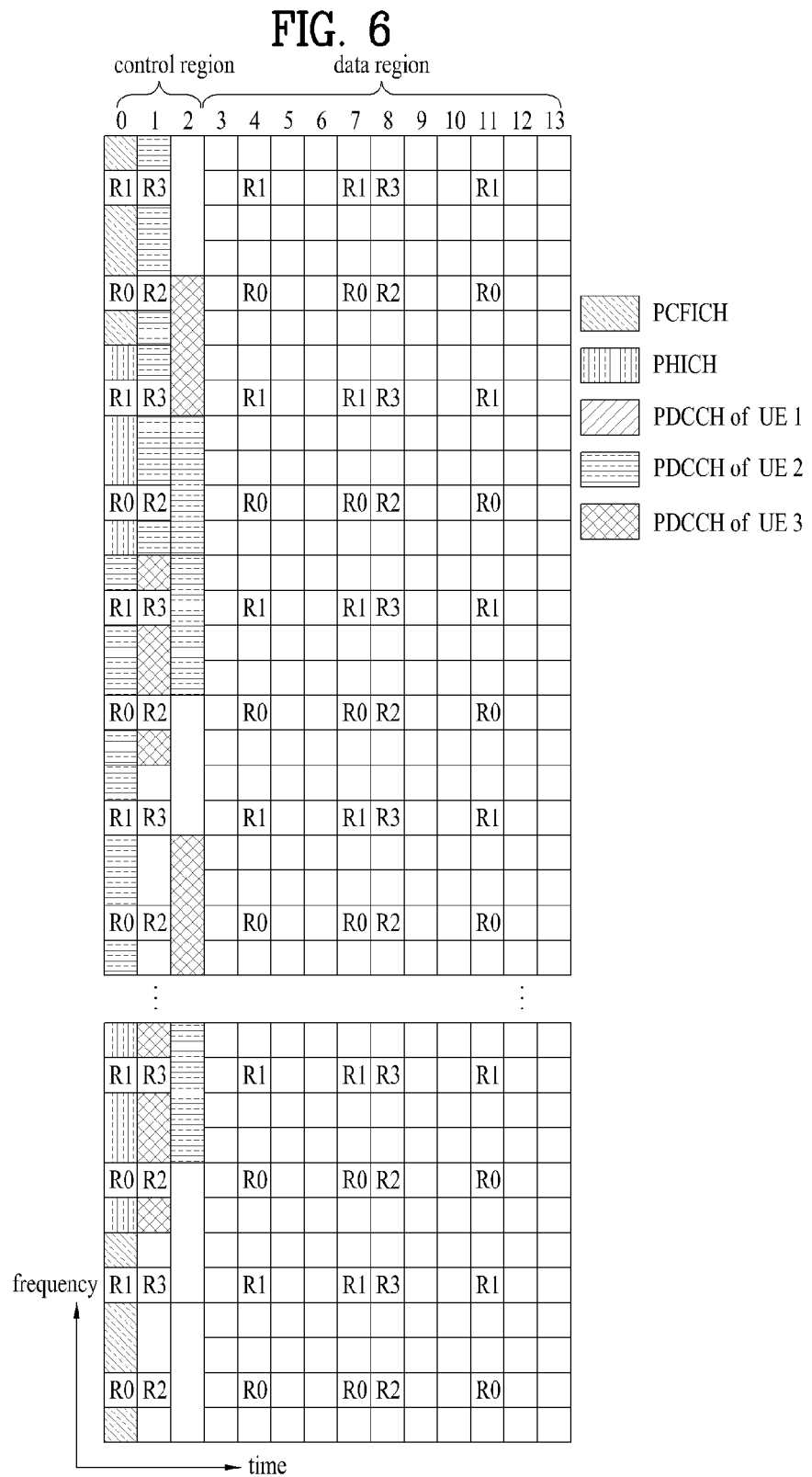
FIG. 6 exemplarily shows a resource grid of a downlink slot.

FIG. 5 is a diagram illustrating a structure of a radio frame for use in a Long Term Evolution (LTE) system.

Referring to FIG. 5, the radio frame has a length of 10 ms ($327200*T_s$) and includes 10 subframes of equal size. Each subframe has a length of 1 ms and includes two slots. Each slot has a length of 0.5 ms ($15360 \times T_s$). In this case, $T_s$ represents a sampling time, and is expressed by '$T_s=1/(15 \text{ kHz} \times 2048)=3.2552 \times 10^{-8}$ (about 33 ns)'. The slot includes a plurality of OFDM or SC-FDMA symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid—Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)—modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which one of UEs will receive data as an input, information indicating how the UEs receive PDSCH data, and information indicating whether the decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Figure 7:
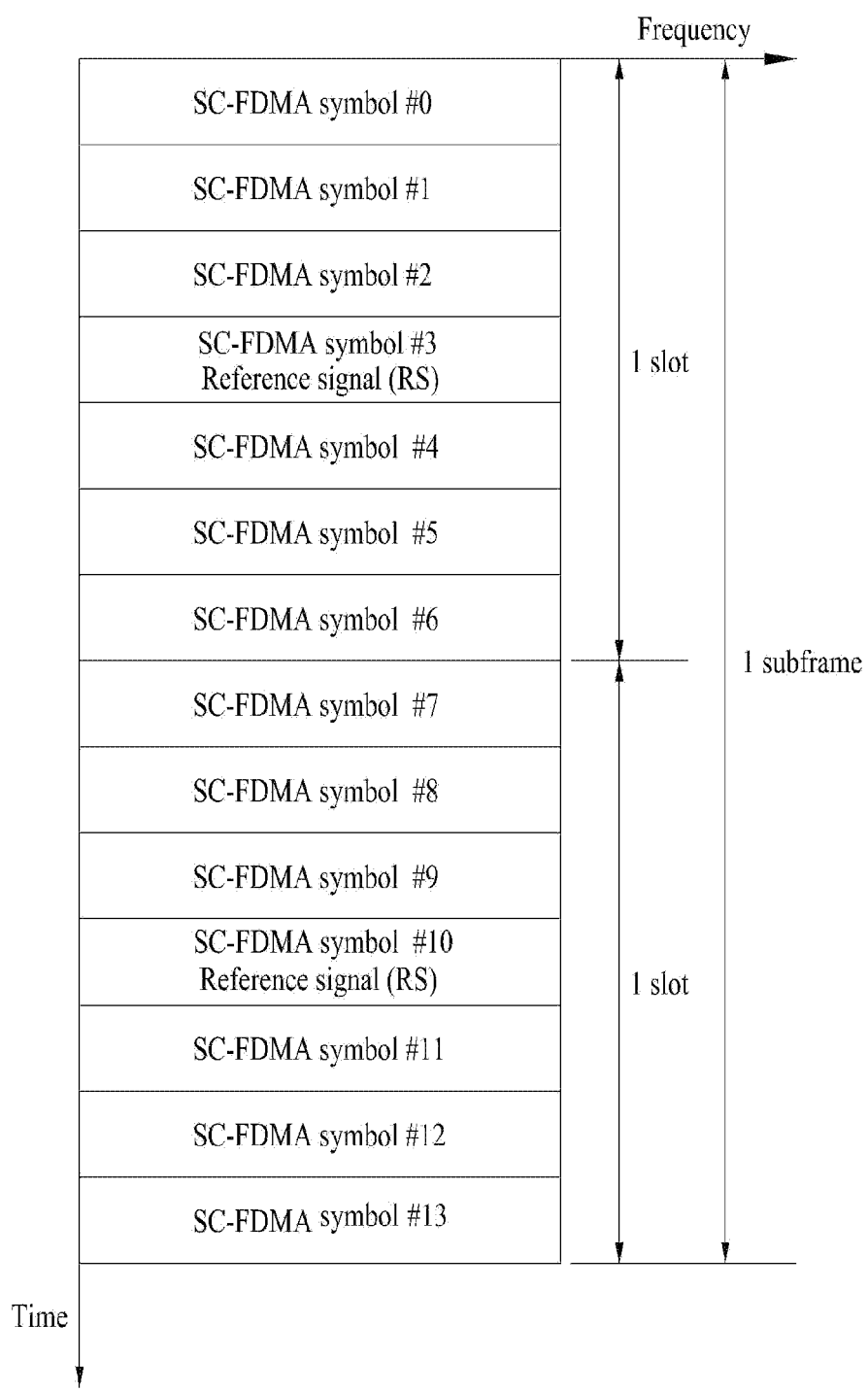
FIG. 7 is a conceptual diagram illustrating a general SC-FDMA transmission frame structure.

FIG. 7 is a conceptual diagram illustrating a general SC-FDMA transmission frame structure.

Referring to FIG. 7, a basic transmission unit on a time axis is one subframe, and two slots make up one subframe. If the cyclic prefix (CP) is a normal CP, the number of symbols in a slot is set to 7. If the cyclic prefix (CP) is an extended CP, the number of symbols in a slot is set to 6. Each slot includes at least one reference signal (RS) symbol. In addition, one SC-FDMA symbol includes a plurality of subcarriers.

A Resource Element (RE) may be defined as "one subcarrier 1×one symbol resource" (i.e., one complex symbol). Assuming that DFT processing is used, RE may be defined as a subcarrier for transmitting one complex symbol defined as a DFT index after completion of DFT processing. However, in the case of SC-FDMA, the number of subcarriers needed for transmitting data is identical to a DFT size such that the number of subcarriers and the DFT size are conceptually identical to each other.

MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as a multi-antenna), so that the capacity or performance can be improved. For convenience of description, the term "MIMO" can also be considered to be a multi-antenna technology.

In more detail, MIMO technology is not dependent on a single antenna path to receive a single total message. Instead, the MIMO technology collects a plurality of data fragments received via several antennas, merges the collected data fragments, and completes total data. As a result, MIMO technology can increase a data transfer rate within a predetermined-sized cell region, or can increase system coverage while guaranteeing a specific data transfer rate. Under this situation, MIMO technology can be widely applied to mobile communication terminals, repeaters, or the like. MIMO technology can extend the range of data communication, so that it can overcome the limited amount of transmission (Tx) data of mobile communication systems.

Figure 8:
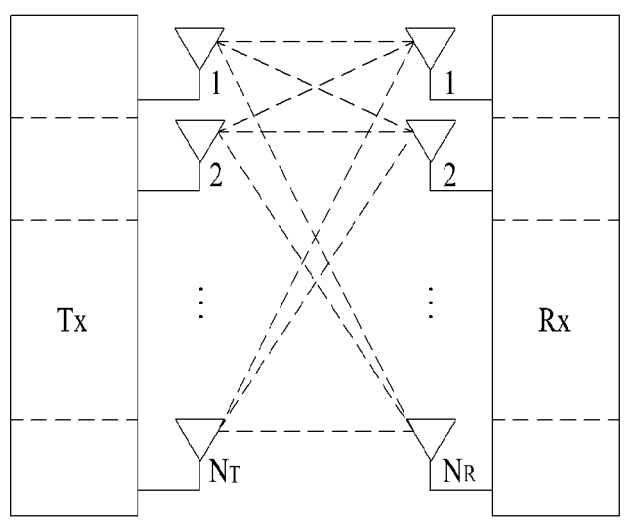
FIG. 8 is a conceptual diagram illustrating a general MIMO communication system.

FIG. 8 is a conceptual diagram illustrating a general MIMO communication system.

Referring to FIG. 8, the number of transmission (Tx) antennas in a transmitter is $N_T$, and the number of reception (Rx) antennas in a receiver is $N_R$. In this way, theoretical channel transmission capacity of the MIMO communication system when both the transmitter and the receiver use a plurality of antennas is greater than that of another case in which only the transmitter or the receiver uses several antennas. The theoretical channel transmission capacity of the MIMO communication system increases in proportion to the number of antennas. Therefore, transfer rate and frequency efficiency are greatly increased. Provided that a maximum transfer rate acquired when a single antenna is used is set to $R_o$, a transfer rate acquired when multiple antennas are used can theoretically increase by a predetermined amount that corresponds to the maximum transfer rate ($R_o$) multiplied by a rate of increase $R_i$. The rate of increase ($R_i$) can be represented by the following equation 1.

$$R_i = \min(N_T, N_R) \quad \text{[Equation 1]}$$

In Equation 1, $R_i$ is a smaller one of $N_T$ and $N_R$.

For example, provided that a MIMO system uses four transmission (Tx) antennas and four reception (Rx) antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

In association with the MIMO technology, a variety of MIMO-associated technologies have been intensively researched by many companies or developers, for example, research into an information theory associated with a MIMO communication capacity calculation under various channel environments or multiple access environments, research into radio frequency (RF) channel measurement and modeling of the MIMO system, and research into a space-time signal processing technology for increasing transmission reliability and transfer rate.

A mathematical modeling of a communication method for use in the above-mentioned MIMO system will hereinafter be described in detail. Firstly, as can be seen from FIG. 8, it is assumed that $N_T$ Tx antennas and $N_R$ Rx antennas exist. In the case of a transmission (Tx) signal, a maximum number of transmission information pieces is $N_T$ under the condition that $N_T$ Tx antennas are used, so that the Tx signal can be represented by a specific vector shown in the following equation 2.

$$s = [s_1, s_2, s_{N_T}]^T \quad \text{[Equation 2]}$$

In the meantime, individual transmission information pieces ($s_1, s_2, \ldots, s_{NT}$) may have different transmission powers. In this case, if the individual transmission powers are denoted by ($P_1, P_2, P_{NT}$), transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, ŝ is denoted using a diagonal matrix P of a transmission power, and can be represented by the following equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector Ŝ having an adjusted transmission power is multiplied by a weight matrix (W), so that $N_T$ transmission (Tx) signals ($x_1, x_2, \ldots, x_{NT}$) to be actually transmitted are configured. In this case, the weight matrix is adapted to properly distribute Tx information to individual antennas according to Tx-channel situations. The above-mentioned Tx signals ($x_1, x_2, \ldots, x_{NT}$) can be represented by the following equation 5 using the vector (x). In Equation 5, $w_{ij}$ is a weight between the i-th Tx antenna and the j-th Tx information, and W is a matrix indicating the weight $w_{ij}$. The matrix W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7.

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

In contrast, if $N_R$ receive (Rx) antennas are used, reception (Rx) signals ($y_1, y_2, \ldots, y_{NR}$) of individual antennas can be represented by a specific vector (y) shown in the following equation 8.

$$y = [y_1, y_2, \ldots, y_{N_R}]^T \quad \text{[Equation 8]}$$

If channel modeling is executed in the MIMO system, individual channels can be distinguished from each other according to transmit/receive (Tx/Rx) antenna indexes. A specific channel passing the range from a transmit (Tx) antenna (j) to a receive (Rx) antenna (i) is denoted by $h_{ij}$. In this case, channels composed of the i-th Rx antenna and $N_T$ Tx antennas can be denoted by the following equation 9.

$$h_i^T = [h_{i1}, h_{i2}, \ldots h_{iN_T}] \quad \text{[Equation 9]}$$

If all channels passing the range from the $N_T$ transmit (Tx) antennas to $N_R$ receive (Rx) antennas are denoted by the matrix shown in Equation 10, the following equation 10 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 10]}$$

Figure 11:
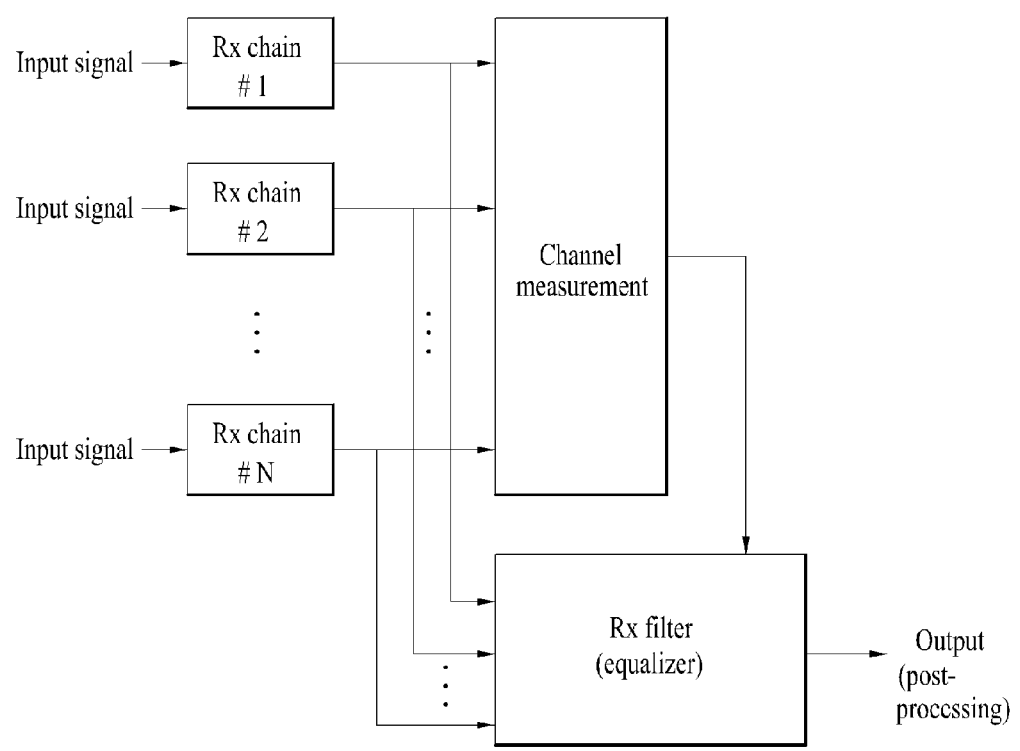
FIG. 11 is a block diagram illustrating a UE applied to general reception filtering.

Additive white Gaussian noise (AWGN) may be received through individual Rx antennas as shown in FIG. 11. The resultant Rx signals can be represented by the following equation 12.

$$n = [n_1, n_2, \ldots, n_{N_R}]^T \quad \text{[Equation 11]}$$

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 12]}$$

$$Hx + n$$

In general, Signal to Interference Noise Ratio (SINR) $\rho_k$ of the k-th antenna for use in the Minimum Mean Square Error (MMSE) receiver is defined as the following equation 13.

$$\rho_k = SINR_k = h_k^H \left( N_0 I_{N_R} + \sum_{\substack{i=1 \\ i \neq k}}^{N_R} h_i h_i^H \right)^{-1} h_k \quad \text{[Equation 13]}$$

In Equation 13, the effective channel $\tilde{H}$ to which the precoding matrix W of the transmitter is applied can be represented by the following equation 14.

$$\tilde{H} = HW \quad \text{[Equation 14]}$$

$$= \begin{bmatrix} \vec{h}_1^T \\ \vec{h}_1^T \\ \vdots \\ \vec{h}_{N_R}^T \end{bmatrix} [w_1 \ w_2 \ \ldots \ w_{N_R}]$$

$$= \begin{bmatrix} \vec{h}_1^T w_1 & \vec{h}_1^T w_2 & \ldots & \vec{h}_1^T w_{N_R} \\ \vec{h}_2^T w_1 & \vec{h}_2^T w_2 & \ldots & \vec{h}_2^T w_{N_R} \\ \vdots & \vdots & \vdots & \vdots \\ \vec{h}_{N_R}^T w_1 & \vec{h}_{N_R}^T w_2 & \ldots & \vec{h}_{N_R}^T w_{N_R} \end{bmatrix}$$

$$= [\tilde{h}_1 \ \tilde{h}_2 \ \ldots \ \tilde{h}_{N_T}]$$

Thus, SINR of the k-th antenna can be represented by the following equation 15.

$$\tilde{\rho}_k = SINR_k \quad \text{[Equation 15]}$$

$$= \tilde{h}_k^H \left( N_0 I_{N_R} + \sum_{\substack{i=1 \\ i \neq k}}^{N_R} \tilde{h}_i \tilde{h}_i^H \right)^{-1} \tilde{h}_k$$

$$= [w_k^H \vec{h}_1^* \ w_k^H \vec{h}_2^* \ \ldots \ w_k^H \vec{h}_{N_R}^*]$$

$$\left( N_0 I_{N_R} + \sum_{\substack{i=1 \\ i \neq k}}^{N_R} \tilde{h}_i \tilde{h}_i^H \right)^{-1} \begin{bmatrix} \vec{h}_1^T w_k \\ \vec{h}_2^T w_k \\ \vdots \\ \vec{h}_{N_R}^T w_k \end{bmatrix}$$

Here, it is possible to observe some effectiveness on received SINR depending on variations of precoding matrix based on theoretical background.

Firstly, it is possible to check on an effectiveness of the column permutation in one precoding matrix. In other words, in case of permutation between i-th column vector $w_i$ and j-th column vector $w_j$, permutated precoding matrix $\hat{W}$ can be represented by the following Equation 16.

$$W = [w_1 \ldots w_i \ldots w_j \ldots w_{N_R}]$$

$$\hat{W} = [w_1 \ldots w_j \ldots w_i \ldots w_{N_R}] \quad \text{[Equation 16]}$$

Accordingly, the effective channel $\tilde{H}$ based on the precoding matrix W and the effective channel $\hat{H}$ based on the precoding matrix×$\hat{W}$ can be represented by the Equation 17 and Equation 18, respectively.

$$\tilde{H} = HW \quad \text{[Equation 17]}$$

$$= \begin{bmatrix} \vec{h}_1^T \\ \vec{h}_1^T \\ \vdots \\ \vec{h}_{N_R}^T \end{bmatrix} [w_1 \ \ldots \ w_i \ \ldots \ w_j \ \ldots \ w_{N_R}]$$

$$= \begin{bmatrix} \vec{h}_1^T w_1 & \ldots & \vec{h}_1^T w_i & \ldots & \vec{h}_1^T w_j & \ldots & \vec{h}_1^T w_{N_T} \\ \vec{h}_2^T w_1 & \ldots & \vec{h}_2^T w_i & \ldots & \vec{h}_2^T w_j & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_i & \ldots & \vec{h}_{N_R}^T w_j & \ldots & \vec{h}_{N_R}^T w_{N_T} \end{bmatrix}$$

$$= [\tilde{h}_1 \ \ldots \ \tilde{h}_i \ \ldots \ \tilde{h}_j \ \ldots \ \tilde{h}_{N_T}]$$

$$\hat{H} = H\hat{W} \quad \text{[Equation 18]}$$

$$= \begin{bmatrix} \vec{h}_1^T \\ \vec{h}_1^T \\ \vdots \\ \vec{h}_{N_R}^T \end{bmatrix} [w_1 \ \ldots \ w_j \ \ldots \ w_i \ \ldots \ w_{N_R}]$$

$$= \begin{bmatrix} \vec{h}_1^T w_1 & \ldots & \vec{h}_1^T w_j & \ldots & \vec{h}_1^T w_i & \ldots & \vec{h}_1^T w_{N_T} \\ \vec{h}_2^T w_1 & \ldots & \vec{h}_2^T w_j & \ldots & \vec{h}_2^T w_i & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_j & \ldots & \vec{h}_{N_R}^T w_i & \ldots & \vec{h}_{N_R}^T w_{N_T} \end{bmatrix}$$

$$= [\tilde{h}_1 \ \ldots \ \tilde{h}_j \ \ldots \ \tilde{h}_i \ \ldots \ \tilde{h}_{N_T}]$$

As can be seen from Equation 17 and Equation 18, even if two column vectors are permutated, received SINR value itself is not changed so that the SINR is constant. In this case, the permutated effective channel and the k-th antenna SINR can be represented by Equation 19 and Equation 20, respectively.

$$\hat{H} = H\hat{W} \quad \text{[Equation 19]}$$

$$= \begin{bmatrix} \vec{h}_1^T \\ \vec{h}_1^T \\ \vdots \\ \vec{h}_{N_R}^T \end{bmatrix} [\hat{w}_1 \ \hat{w}_2 \ \ldots \ \hat{w}_{N_R}]$$

$$= \begin{bmatrix} \vec{h}_1^T \hat{w}_1 & \vec{h}_1^T \hat{w}_2 & \ldots & \vec{h}_1^T \hat{w}_{N_R} \\ \vec{h}_2^T \hat{w}_1 & \vec{h}_2^T \hat{w}_2 & \ldots & \vec{h}_2^T \hat{w}_{N_R} \\ \vdots & \vdots & \vdots & \vdots \\ \vec{h}_{N_R}^T \hat{w}_1 & \vec{h}_{N_R}^T \hat{w}_2 & \ldots & \vec{h}_{N_R}^T \hat{w}_{N_R} \end{bmatrix}$$

$$= [\hat{h}_1 \ \hat{h}_2 \ \ldots \ \hat{h}_{N_T}]$$

$$\hat{\rho}_k = SINR_k = \hat{h}_k^H \left( N_0 I_{N_R} + \sum_{\substack{i=1 \\ i \neq k}}^{N_R} \hat{h}_i \hat{h}_i^H \right)^{-1} \hat{h}_k \quad \text{[Equation 20]}$$

The interference and noise parts can be represented as shown in Equation 20, and are identical to those of Equation 21.

$$\left(N_0 I_{N_R} + \sum_{\substack{i=1 \\ i \neq k}}^{N_R} \hat{h}_i \hat{h}_i^H\right)^{-1} = \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix}$$ [Equation 21]

Therefore, Equation 20 can be represented by the following equation 22.

$$\hat{\rho}_k = SINR_k \quad \text{[Equation 22]}$$
$$= \hat{h}_k^H \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix} \hat{h}_k$$
$$= \sum_{i=1}^{N_R} \sum_{j=1}^{N_R} \hat{w}_k \vec{h}_i^* \times a_{ij} \times \vec{h}_j^T \hat{w}_k$$

It is possible to check on effectiveness of multiplexing $e^{-j\theta}$ ($0 \leq \theta \leq 2\pi$) to a specific column vector in one precoding matrix. Simply, $\pm 1, \pm j$ can be possible values as some examples. For convenience of description, it may be possible to use the values of $\pm 1$ and $\pm j$ in the embodiments.

$\tilde{W}_k$ obtained when $e^{-j\theta}$ is multiplexed to the k-th column vector can be represented by the following Equation 23.

$$\tilde{W}_k = e^{-j\theta} \hat{W}_k \quad \text{[Equation 23]}$$

Here, SINR of the k-th antenna can be represented by the following Equation 24.

$$\tilde{\rho}_k = \sum_{i=1}^{N_R} \sum_{j=1}^{N_R} \tilde{w}_k \vec{h}_i^* \times a_{ij} \times \vec{h}_j^T \tilde{w}_k \quad \text{[Equation 24]}$$
$$= \sum_{i=1}^{N_R} \sum_{j=1}^{N_R} e^{+j\theta} \hat{w}_k \vec{h}_i^* \times a_{ij} \times \vec{h}_j^T e^{-j\theta} \hat{w}_k$$
$$= \sum_{i=1}^{N_R} \sum_{j=1}^{N_R} \hat{w}_k \vec{h}_i^* \times a_{ij} \times \vec{h}_j^T \hat{w}_k$$
$$= \hat{\rho}_k$$

As can be seen from Equation 24, although $e^{-j\theta}$ ($0 \leq \theta \leq 2\pi$) is applied to the specific column vector, there is no influence upon SINR of the k-th antenna.

Figure 9:
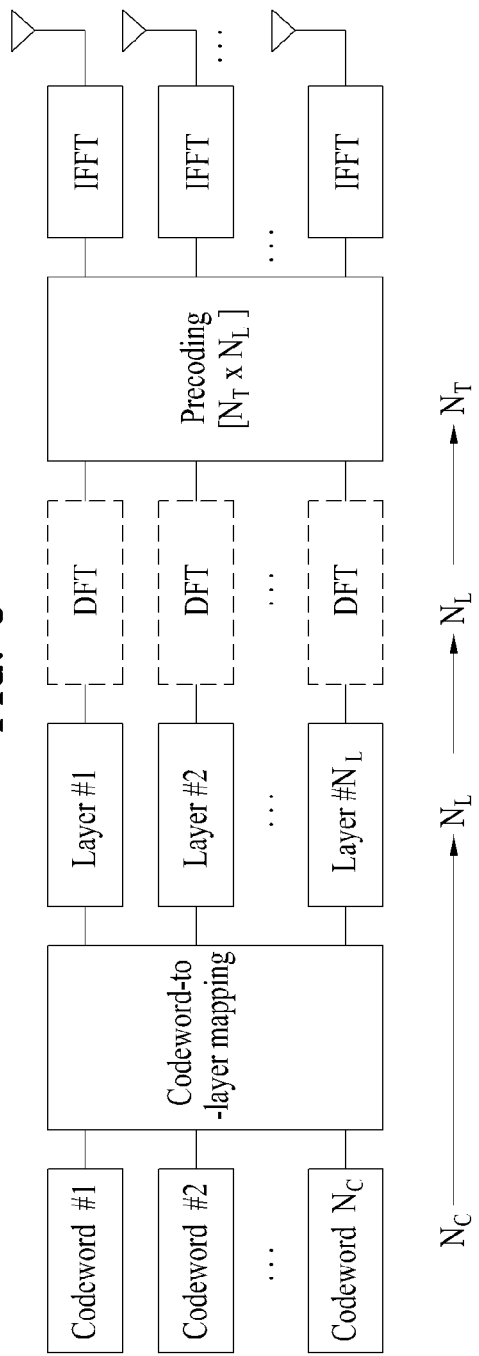
FIG. 9 is a conceptual diagram illustrating the mapping relationship among codewords, layers and antennas for transmitting uplink data in a MIMO wireless communication system.

FIG. 9 is a conceptual diagram illustrating the mapping relationship among codewords, layers and antennas for transmitting uplink data in a MIMO wireless communication system.

Referring to FIG. 9, a complicated mapping relationship exists between data information and transmission symbols. A MAC layer as data information transmits $N_c$ transport blocks to a physical layer. In the physical layer, the transport blocks are converted into codewords through a channel coding process and rate matching such as a puncturing or repetition process is performed. In this case, channel coding is performed in a channel coder such as a turbo encoder or a tail biting convolution encoder.

After the channel coding and rate matching processes, $N_c$ codewords are mapped to $N_L$ layers. A layer refers to each of different pieces of information transmitted using MIMO technology. The number of layers cannot be greater than a rank which is a maximum number of different pieces of information capable of being transmitted.

For reference, unlike OFDMA transmission which is a general downlink transmission scheme, an uplink signal transmitted according to an SC-FDMA scheme is subject to a DFT process with respect to each layer so that a transmission signal has properties of a single subcarrier by partially offsetting an influence of Inverse Fast Fourier Transform (IFFT) processing. DFT-converted signals in each layer are multiplied by a precoding matrix, mapped to $N_T$ transmission antennas, and transmitted to a BS through an IFFT process.

On the contrary, PAPR (Peak to Average Power Ratio) is associated with a dynamic range to be supported by a power amplifier of the transmitter. CM (Cubic Metric) may be another value capable of being replaced with a specific value denoted by PAPR. Generally, CM or PAPR of a single-carrier characteristic signal such as the SC-FDMA transmission signal is excessively lower than CM or PAPR of a multi-carrier signal such as OFDMA. For example, assuming that one information symbol is transmitted through one subcarrier and a Tx signal y is composed of an information symbol $x_1$ only, the Tx signal is denoted by a single carrier signal $y=x_1$. However, assuming that the Tx signal is composed of a plurality of information symbols $x_1, x_2, x_3, \ldots, x_N$, the Tx signal is denoted by a multi-carrier signal $y=x_1+x_2+x_3+\ldots+x_N$. The signal transmitted through multiple carriers is formed by overlapping of information symbols so as to generate a high-amplitude signal, such that the resultant signal has a high CM or PAPR.

Meanwhile, in an LTE-A system of a next-generation mobile communication system, a Coordinated Multi-Point (CoMP) transmission scheme, which has not been supported in legacy standards, is expected to be supported to improve data transfer rate. The CoMP transmission scheme refers to a transmission scheme in which two or more eNBs or cells perform coordinate communication with a UE to improve communication performance between a UE located in a shadow area and an eNB (or cell or sector).

The CoMP transmission scheme may be divided into a coordinated MIMO Joint Processing (CoMP-JP) scheme through data sharing and a CoMP-Coordinated Scheduling/Beamforming (CoMP-CS/CB) scheme.

For downlink, in the CoMP-JP scheme, a UE may instantaneously and simultaneously receive data from individual eNBs employing a CoMP transmission scheme and may combine the received data, thereby improving reception performance (Joint Transmission (JT)). In the CoMP-CS/CB scheme, however, the UE may instantaneously receive data from one eNB through beamforming.

For uplink, in the CoMP-JP scheme, individual eNBs may simultaneously receive a PUSCH signal from a UE. In the CoMP-CS/CB scheme, however, only one eNB receives the PUSCH signal. Whether to use the CoMP-CS/CB scheme is determined by coordinated cells (or eNBs). The CoMP-CS/CB scheme will hereinafter be described with reference of the attached drawing.

Figure 10:
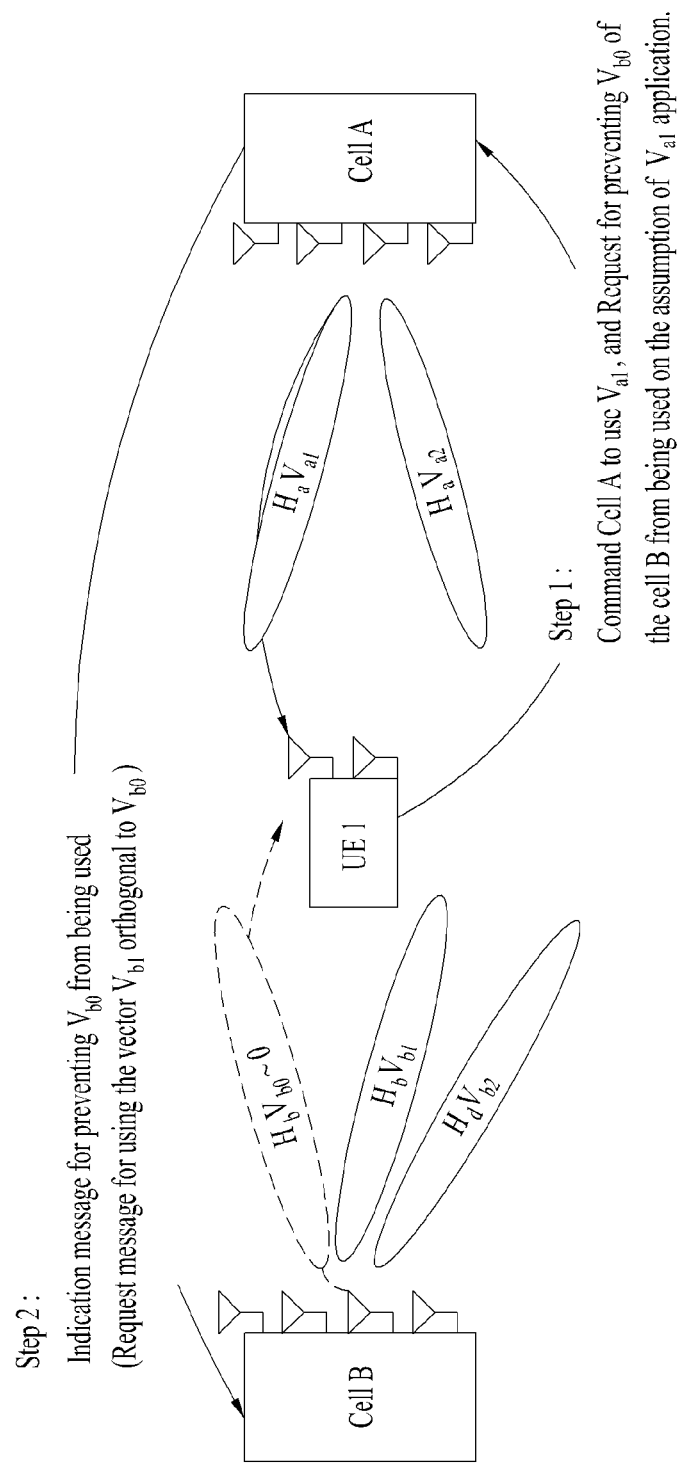
FIG. 10 is a conceptual diagram illustrating a general coordinated scheduling/beamforming transmission scheme.

FIG. 10 is a conceptual diagram illustrating a general coordinated scheduling/beamforming (CoMP-CS/CB) transmission scheme.

Referring to FIG. 10, according to the CoMP-CS/CB transmission scheme, a UE measures a signal channel, such that it may perform signaling of beamforming vector information (e.g., precoding matrix or vector) $V_{a1}$ to be recommended by a serving cell (Cell A).

Assuming that the serving cell transmits signals using the above beamforming vector $V_{a1}$, the serving cell measures an interference channel from a contiguous cell (Cell B) such that it may inform the serving cell (Cell A) of specific information $V_{b0}$ indicating a vector or matrix related to the highest-interference sub-space.

Finally, the serving cell may inform the contiguous cell (Cell B) of the specific information $V_{b0}$, and may request the contiguous cell (Cell B) not to use the specific information $V_{b0}$ That is, the serving cell may transmit a request for transmitting a signal using $V_{b0}$ and $V_{b1}$, where $V_{b0}$ and $V_{b1}$ are orthogonal to each other.

However, information of the precoding matrix or vector that is fed back from the UE to the serving cell is quantized, and beamforming based on the quantized information has disadvantages in that leakage interference may further exist. Specifically, assuming that MU-MIMO transmission is carried out in another cell, beamforming is carried out using feedback vector information. Thus, although interference nulling is maximally carried out using the CoMP-CS/CB transmission scheme, it is impossible to prevent such interference from occurring. In addition, there is a need to consider the interference problem of Demodulation Reference Signal (DM-RS) acting as a UE-specific reference signal, and a detailed description thereof will hereinafter be described with reference to FIG. 11.

FIG. 11 is a block diagram illustrating a UE applied to general reception filtering.

Generally, channel measurement must be performed in advance in such a manner that a UE can equalize the Rx signal or perform application of receive filtering (Rx filtering), and such channel measurement is carried out on the basis of a DM-RS acting as a DL UE-specific RS. Assuming that channel measurement is carried out using DM-RS, it is possible to use equalization or Rx filtering for interference suppression.

Referring to FIG. 11, the UE may perform in advance channel measurement on the basis of a DM-RS acting as a DL UE-specific RS, and may perform equalization or Rx filtering of the Rx signal on the basis of the channel measurement information.

However, assuming that high interference exists from the beginning, the high interference may greatly affect channel measurement through DM-RS. As a result, although the UE includes many more Rx antenna chains, there is a high possibility of generating channel measurement errors, resulting in throughput deterioration. Therefore, there is a need to reduce interference for channel measurement using DM-RS. However, there is a need to perform Rx filtering so as to reduce interference. For this purpose, channel measurement must be carried out in advance, and channel measurement is not smoothly carried out due to the occurrence of interference.

Therefore, interference from beamforming data obtained by the presence of multiple Rx antennas can be relatively and easily suppressed. In contrast, the present invention provides a method for re-utilizing a pre-calculated Rx filter so as to solve the RS problem in which it becomes more difficult to suppress RS interference.

In more detail, if the UE feeds back information of a vector or matrix of a sub-space to the serving cell so as to suppress interference from a contiguous cell, the UE memories the Rx filter corresponding to a vector or matrix of the sub-space, and receives signaling information as to whether the corresponding Rx filter is used from the serving cell, such that the present invention provides a method for performing pre-receive filtering prior to execution of channel measurement through DM-RS.

Figure 12:
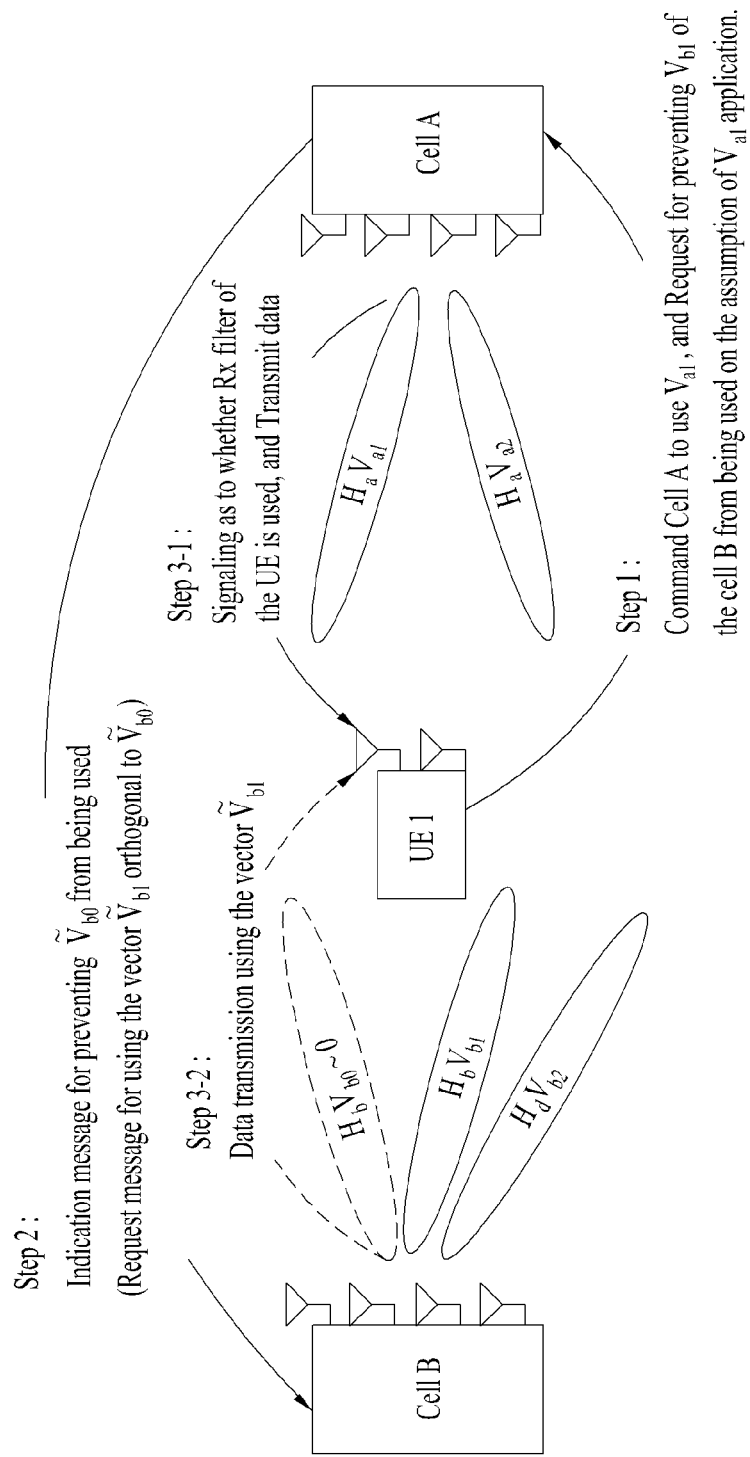
FIG. 12 is a conceptual diagram illustrating a coordinated scheduling/beamforming transmission scheme according to embodiments of the present invention.

FIG. 12 is a conceptual diagram illustrating a coordinated scheduling/beamforming (CoMP-CS/CB) transmission scheme according to embodiments of the present invention.

Referring to FIG. 12, when the serving cell transmits DL control information, it is preferable that DL control information transmitted on PDCCH may include specific information as to whether the Rx filter signaled by a UE is used. That is, the above DL control information may include specific information as to whether a DL transmission scheme indicated by the UE is used, or may include specific information as to whether a Tx beamforming vector fed back from the UE is used. In addition, the above DL control information may further include other information as to whether a feedback signal not to be used in the contiguous cell is approved.

In the meantime, assuming that precoding matrix (or vector) information, that may be identical or similar to a maximum number of layers (i.e., Tx rank) supportable by the UE, is fed back, the actual UE does not have a sufficient Rx-degree of freedom through which interference can be suppressed using the Rx filter, such that it may be impossible to perform pre-receive filtering so as to perform channel measurement. In this case, it may be impossible to feed back the sub-space matrix or vector for suppressing interference from a contiguous cell.

In addition, on the assumption that specific information as to whether a UE-signaled Rx filter is used is not explicitly contained in control information, and the corresponding information is always contained in a specific transmission mode established through a higher layer, the UE can be operated.

Detailed examples of the embodiments will hereinafter be described in detail.

Assuming that a channel between the UE and the serving cell (Cell A) is denoted by $H_a$ and SVD (Singular Value Decomposition) processing is applied to $H_a$, the SVD result can be represented by the following equation 25

$$H_a = U_a \cdot \Lambda_a \cdot V_a^H \quad \text{[Equation 25]}$$

In Equation 25, a channel between a UE and a contiguous cell (Cell B) causing interference is denoted by $H_b$.

In this case, the UE quantizes the vector $V_{a1}$ desired by the cell A, and feeds back the quantized result. In this case, the vector $V_{a1}$ is some vectors of $V_a = [V_{a1} \; V_{a0}]$, and may be a vector having the highest singular value. In this case, the Rx filter capable of optimally receiving the vector $V_{a1}$ may be denoted by $U_{a1}^H$ corresponding to some vectors of $U_a^H = [U_{a1}^H \; U_{a0}^H]$. Therefore, it is preferable that the UE may use $U_{a1}^H$ as a pre-receive filter.

The UE to which the Rx filter $U_{a1}^H$ is applied may measure the effective channel $\tilde{H}_b$ between the cell B and the UE so as to feed back a vector for suppressing interference from the cell B to the cell A acting as a serving cell, and the effective channel $\tilde{H}_b$ may be represented by the following equation 26.

$$\tilde{H}_b = U_{a1}^H \cdot \tilde{H}_b \quad \text{[Equation 26]}$$

SVD may be applied to the effective channel $\tilde{H}_b$ as shown in the following equation 27.

$$\tilde{H}_b = \tilde{U}_b \cdot \tilde{\Lambda}_b \cdot \tilde{V}_b^H \quad \text{[Equation 27]}$$

In this case, the UE may feed back a subspace $\tilde{V}_{b0}$ corresponding to some vectors of $\tilde{V}_b = [\tilde{V}_{b1} \; \tilde{V}_{b0}]$ that acts as the highest-interference beamforming vector from the cell B, to the cell A acting as the serving cell.

In addition, the cell B may obtain the subspace $\tilde{V}_{b1}$ acting as a null space using the feedback resultant value $\tilde{V}_{b0}$. Alternatively, the UE or the cell 1 A may calculate the subspace $\tilde{V}_{b1}$, and feed back the calculate result. Therefore, the cell B may transmit signals in the direction of $\tilde{V}_{b1}$.

Likewise, the UE may feed back $V_{a1}$ and $\tilde{V}_{b0}$ (or $\tilde{V}_{b1}$) to the cell A serving as the serving cell, and may receive specific information as to whether vectors fed back from the UE is used as a response to the feedback information. As a result, the UE may perform pre-receive filtering of all the Rx signals such as DM-RS using the predetermined Rx filter $U_{a1}^H$.

Figure 13:
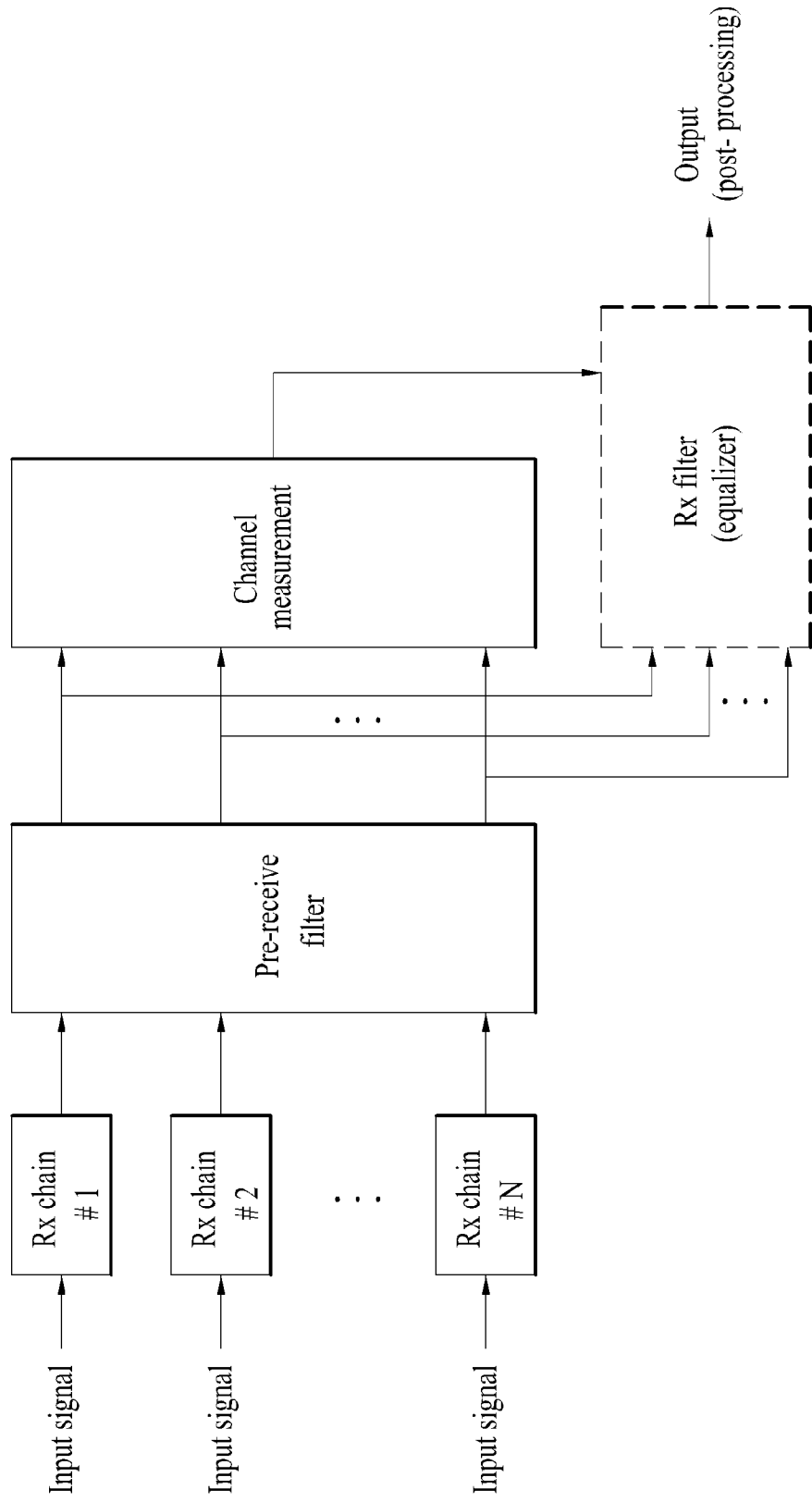
FIG. 13 is a block diagram illustrating a UE applied to pre-reception filtering according to embodiments of the present invention.

FIG. 13 is a block diagram illustrating a UE applied to pre-reception filtering according to embodiments of the present invention.

Referring to FIG. 13, assuming that it is possible to apply the predetermined Rx filter using BS (eNB) signaling, the UE may perform channel measurement by performing pre-receive filtering of the Rx signal prior to execution of channel measurement. In addition, the equalization process based on the channel measurement result obtained by such pre-receive filtering is additionally applied and the demodulation and decoding process are then carried out.

Figure 14:
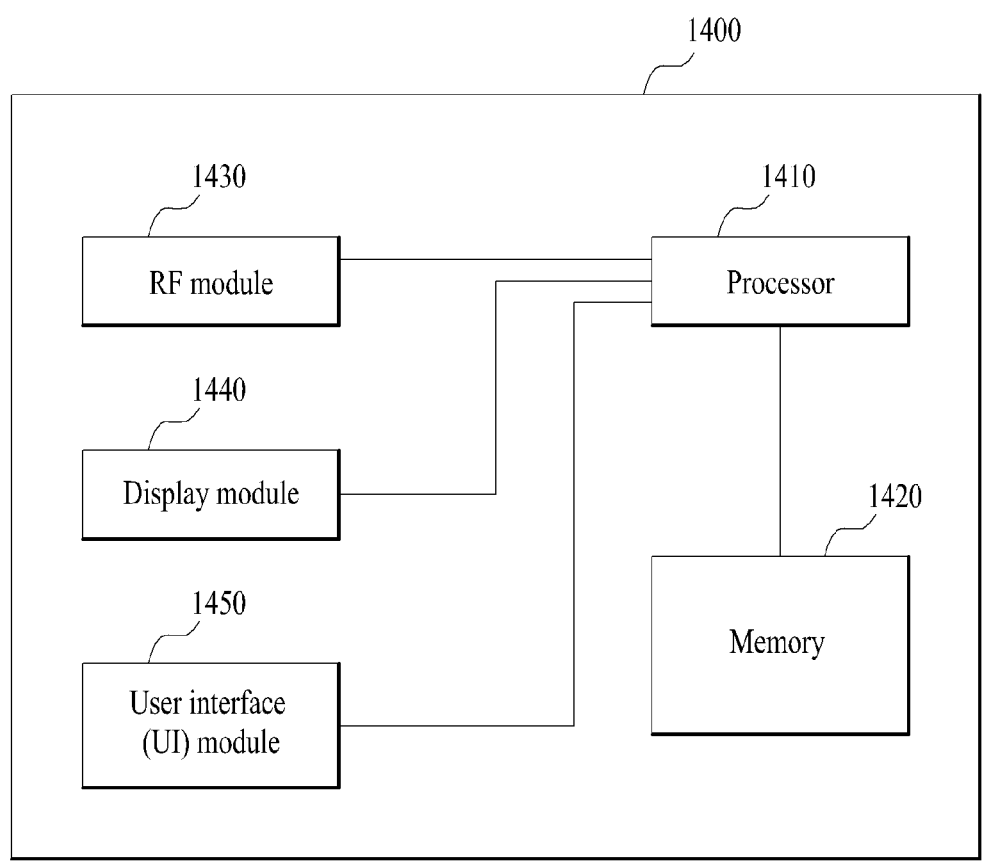
FIG. 14 is a block diagram illustrating a communication device according to embodiments of the present invention.

FIG. 14 is a block diagram illustrating a communication device according to embodiments of the present invention.

In FIG. 14, the communication device 1400 includes a processor 1410, a memory 1420, a Radio Frequency (RF) module 1430, a display module 1440, and a user interface (UI) module 1450.

The communication device 1400 is disclosed only for illustrative purposes, and certain modules may also be omitted from the communication device 1400 as necessary. In addition, the communication device 1400 may further include necessary modules. Some modules of the communication device 1400 may be identified as more detailed modules. The processor 1410 is configured to carry out the operations of the embodiments of the present invention. For detailed operations of the processor 1410 reference may be made to FIGS. 1 to 13.

The memory 1420 is connected to the processor 1410, and stores an operating system, an application, program code, data and the like. The RF module 1430 is connected to the processor 1410, converts a baseband signal into a radio frequency (RF) signal, or converts the RF signal into the baseband signal. For these operations, the RF module 1430 performs analog conversion, amplification, filtering, and frequency up-conversion in order or performs such operations in reverse order. The display module 1440 is connected to the processor 1410 and displays a variety of information. The scope or spirit of the display module 1440 of the present invention is not limited thereto, and the display module 1440 may be any of well-known elements, for example, a Liquid Crystal Display (LCD), a Light Emitting Diode (LED), an Organic Light Emitting Diode (OLED) and the like. The user interface (UI) module 1450 is connected to the processor 1410, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, although the method and apparatus for suppressing interference of a UE in a MIMO wireless communication system have been disclosed on the basis of application to the 3GPP LTE system, the inventive concept of the present invention is applicable not only to the 3GPP LTE system, but also to other mobile communication systems.

The invention claimed is:
1. A method for processing a signal by a user equipment (UE) in a wireless communication system, the method comprising:
 calculating a recommended transmit (Tx) beamforming vector $V_{a1}$ of a serving cell and a pre-receive filtering vector $U_{a1}^H$, on the basis of a channel $H_a$ related to the serving cell;

calculating an effective channel $\tilde{H}_b$ related to the contiguous cell by applying the pre-receive filtering vector $U_{a1}^H$ to a signal received from a contiguous cell;

calculating a restricted beamforming vector $\tilde{V}_{b0}$ of the contiguous cell on the basis of the effective channel $\tilde{H}_b$;

transmitting information of the Tx beamforming vector $V_{a1}$ and the restricted beamforming vector $\tilde{V}_{b0}$ to the serving cell;

receiving a response signal obtained by application of the Tx beamforming vector $V_{a1}$ and the restricted beamforming vector $\tilde{V}_{b0}$, from the serving cell; and after application of the pre-receive filtering vector $U_{a1}^H$, receiving a signal to which the Tx beamforming vector $V_{a1}$ is applied from the serving cell.

2. The method according to claim 1, wherein the contiguous cell transmits a signal using a beamforming vector $\tilde{V}_{b1}$ orthogonal to the restricted beamforming vector $\tilde{V}_{b0}$.

3. The method according to claim 1, wherein the application response signal is received from the serving cell through a physical downlink control channel (PDCCH).

4. The method according to claim 1, wherein the application response signal is received from the serving cell through higher layer signaling.

5. The method according to claim 1, wherein the recommended Tx beamforming vector is $V_{a1}$ a vector which has a highest singular value at $V_a(=[V_{a1}\ V_{a0}])$ calculated on the basis of the channel $H_a$.

6. The method according to claim 1, wherein the information of the restricted beamforming vector $\tilde{V}_{b0}$ denotes information related to a beamforming vector $\tilde{V}_{b1}$ orthogonal to the restricted beamforming vector $\tilde{V}_{b0}$.

7. The method according to claim 1, wherein the channel $H_a$ is denoted by $U_a \cdot \Lambda_a \cdot V_a^H$, and the effective channel $\tilde{H}_b$ related to the contiguous cell is denoted by $\tilde{U}_b \cdot \tilde{\Lambda}_b \cdot \tilde{V}_b^H$.

8. A user equipment (UE) for use in a wireless communication system comprising:

a radio frequency (RF) communication module configured to transmit/receive a signal to/from one or more cells; and a processor configured to control the RF communication module and process the signal, wherein the processor calculates a recommended transmit (Tx) beamforming vector $V_{a1}$ of a serving cell and a pre-receive filtering vector $U_{a1}^H$ on the basis of a channel $H_a$ related to the serving cell, calculates an effective channel $\tilde{H}_b$ related to the contiguous cell by applying the pre-receive filtering vector $U_{a1}^H$ to a signal received from a contiguous cell, calculates a restricted beamforming vector $\tilde{V}_{b0}$ of the contiguous cell on the basis of the effective channel $\tilde{H}_b$, and the RF communication module transmits information of the Tx beamforming vector $V_{a1}$ and the restricted beamforming vector $\tilde{V}_{b0}$ to the serving cell, receives a response signal obtained by application of the Tx beamforming vector $V_{a1}$ and the restricted beamforming vector $\tilde{V}_{b0}$ from the serving cell, and after application of the pre-receive filtering vector $U_{a1}^H$, receives a signal to which the Tx beamforming vector $V_{a1}$ is applied from the serving cell.

9. The user equipment (UE) according to claim 8, wherein the contiguous cell transmits a signal using a beamforming vector $\tilde{V}_{b1}$ orthogonal to the restricted beamforming vector $\tilde{V}_{b0}$.

10. The user equipment (UE) according to claim 8, wherein the application response signal is received from the serving cell through a physical downlink control channel (PDCCH).

11. The user equipment (UE) according to claim 8, wherein the application response signal is received from the serving cell through higher layer signaling.

12. The user equipment (UE) according to claim 8, wherein the recommended Tx beamforming vector $V_{a1}$ is a vector which has a highest singular value at $V_a(=[V_{a1}\ V_{a0}])$ calculated on the basis of the channel $H_a$.

13. The user equipment (UE) according to claim 8, wherein the information of the restricted beamforming vector $\tilde{V}_{b0}$ denotes information related to a beamforming vector $\tilde{V}_{b1}$ orthogonal to the restricted beamforming vector $\tilde{V}_{b0}$.

14. The user equipment (UE) according to claim 8, wherein the channel $H_a$ is denoted by $U_a \cdot \Lambda_a \cdot V_a^H$, and the effective channel $\tilde{H}_b$ related to the contiguous cell is denoted by $\tilde{U}_b \cdot \tilde{\Lambda}_b \cdot \tilde{V}_b^H$.

* * * * *